United States Patent
He et al.

(10) Patent No.: US 10,630,470 B2
(45) Date of Patent: Apr. 21, 2020

(54) ZONE BASED KEY VERSION ENCODING

(71) Applicant: EntIT Software LLC, Sunnyvale, CA (US)

(72) Inventors: Cheryl He, Sunnyvale, CA (US); Timothy Roake, Sunnyvale, CA (US); Luther Martin, Sunnyvale, CA (US)

(73) Assignee: MICRO FOCUS LLC, Santa Clara, CA (US)

( * ) Notice: Subject to any disclaimer, the term of this patent is extended or adjusted under 35 U.S.C. 154(b) by 241 days.

(21) Appl. No.: 15/720,910

(22) Filed: Sep. 29, 2017

(65) Prior Publication Data

US 2019/0103963 A1    Apr. 4, 2019

(51) Int. Cl.
*H04L 9/08* (2006.01)
*H04L 9/06* (2006.01)

(52) U.S. Cl.
CPC .......... *H04L 9/0861* (2013.01); *H04L 9/0668* (2013.01); *H04L 9/0819* (2013.01); *H04L 9/0838* (2013.01); *H04L 9/0894* (2013.01)

(58) Field of Classification Search
CPC ... H04L 9/0861; H04L 9/0894; H04L 9/0838; H04L 9/0819; H04L 9/0668
See application file for complete search history.

(56) References Cited

U.S. PATENT DOCUMENTS

| | | | |
|---|---|---|---|
| 9,373,113 B2 | 6/2016 | Tahon et al. | |
| 9,652,698 B2 | 5/2017 | Gravely et al. | |
| 9,672,515 B2 | 6/2017 | Hogan et al. | |
| 10,162,978 B2* | 12/2018 | Sun | G06F 21/6218 |
| 2002/0129242 A1* | 9/2002 | Abbott | H04L 9/0894 |
| | | | 713/157 |
| 2010/0095130 A1 | 4/2010 | Bertran et al. | |
| 2010/0223186 A1* | 9/2010 | Hogan | G06Q 20/02 |
| | | | 705/71 |
| 2016/0352518 A1* | 12/2016 | Ford | G06F 12/1408 |
| 2017/0083716 A1* | 3/2017 | Sun | G06F 21/6218 |
| 2017/0201384 A1* | 7/2017 | Ignatchenko | G06F 21/602 |
| 2018/0176017 A1* | 6/2018 | Rodriguez | H04L 63/08 |
| 2018/0330079 A1* | 11/2018 | Gray | G06F 21/602 |
| 2019/0005262 A1* | 1/2019 | Surla | G06F 21/6227 |
| 2019/0034643 A1* | 1/2019 | Kludy | G06F 21/602 |

OTHER PUBLICATIONS

Gustavus J. Simmons, "Cryptology", download date Sep. 29, 2017, pp. 22. https://www.britannica.com/topic/cryptology.

* cited by examiner

*Primary Examiner* — Joseph P Hirl
*Assistant Examiner* — Thomas A Gyorfi (57) ABSTRACT

In some examples, with respect to zone based key version encoding, data that is to be encrypted may be ascertained, and a key, including a key version, that is to be used to encrypt the ascertained data may be ascertained. Encrypted data may be generated by encrypting the ascertained data based on the ascertained key, and a zone representing the key version may be determined. Further, encrypted zoned data may be generated by applying the determined zone to the encrypted data to encode the key version, and the encrypted zoned data including the encoded key version may be stored.

20 Claims, 7 Drawing Sheets

FIG. 1

| BCD Digit | Zone 0 | Zone1 | Zone2 | Zone3 | Zone4 | Zone5 | Zone6 | Zone7 |
|---|---|---|---|---|---|---|---|---|
| +0 | 00 | 20 | 40 | 60 | 80 | A0 | C0 | E0 |
| +1 | 01 | 21 | 41 | 61 | 81 | A1 | C1 | E1 |
| +2 | 02 | 22 | 42 | 62 | 82 | A2 | C2 | E2 |
| +3 | 03 | 23 | 43 | 63 | 83 | A3 | C3 | E3 |
| +4 | 04 | 24 | 44 | 64 | 84 | A4 | C4 | E4 |
| +5 | 05 | 25 | 45 | 65 | 85 | A5 | C5 | E5 |
| +6 | 06 | 26 | 46 | 66 | 86 | A6 | C6 | E6 |
| +7 | 07 | 27 | 47 | 67 | 87 | A7 | C7 | E7 |
| +8 | 08 | 28 | 48 | 68 | 88 | A8 | C8 | E8 |
| +9 | 09 | 29 | 49 | 69 | 89 | A9 | C9 | E9 |
| -0 | 10 | 30 | 50 | 70 | 90 | B0 | D0 | F0 |
| -1 | 11 | 31 | 51 | 71 | 91 | B1 | D1 | F1 |
| -2 | 12 | 32 | 52 | 72 | 92 | B2 | D2 | F2 |
| -3 | 13 | 33 | 53 | 73 | 93 | B3 | D3 | F3 |
| -4 | 14 | 34 | 54 | 74 | 94 | B4 | D4 | F4 |
| -5 | 15 | 35 | 55 | 75 | 95 | B5 | D5 | F5 |
| -6 | 16 | 36 | 56 | 76 | 96 | B6 | D6 | F6 |
| -7 | 17 | 37 | 57 | 77 | 97 | B7 | D7 | F7 |
| -8 | 18 | 38 | 58 | 78 | 98 | B8 | D8 | F8 |
| -9 | 19 | 39 | 59 | 79 | 99 | B9 | D9 | F9 |

ZONE BASED KEY VERSION ENCODING

BACKGROUND

Encryption may be described as the process of encoding or altering information so as to limit access to the information to an authorized entity. If an unauthorized entity ascertains the encrypted information, absent a key that is used to decrypt the encrypted information, the encrypted information may be unintelligible to the unauthorized entity. The encrypted information may be referred to as ciphertext. The key may be generated by a process that generates pseudo-random encryption keys.

BRIEF DESCRIPTION OF DRAWINGS

Features of the present disclosure are illustrated by way of example and not limited in the following figure(s), in which like numerals indicate like elements, in which.

DETAILED DESCRIPTION

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Zone based key version encoding apparatuses, methods for zone based key version encoding, and non-transitory computer readable media having stored thereon machine readable instructions to provide zone based key version encoding are disclosed herein. The apparatuses, methods, and non-transitory computer readable media disclosed herein provide for the storage of a key version within parts of a binary-coded-decimal (BCD) format known as zone bits, and therefore storage of the key version as metadata embedded in a binary-coded-decimal value. The storage of the key version as metadata embedded in a binary-coded-decimal value eliminates the need for an external storage to separately store the key version. Thus, by storage of the key version as metadata embedded in a binary-coded-decimal value, storage systems need not be modified in that the need for a secondary storage source for the key version is eliminated.

With respect to storage of a key version as metadata embedded in a binary-coded-decimal value, format preserving encryption (FPE) is a form of encryption that does not change the underlying layout of data such that an encrypted version of the data looks like valid data and can be placed in databases or data stores without changing the data schema. For example, binary-coded-decimal numbers may be encrypted by using format preserving encryption such that the numbers still maintain the same format when encrypted. The encryption utilizes a secret key, and often the key is selected from a list of keys. The key version of the selected key needs to be stored in some way so the encrypted data can be decrypted using the correct key. However, storage of the key version may entail a change in the database or data store schema, which can add technical complexities to the storage of the key version.

An encrypt/decrypt operation may use a key value, and the key value may need to be stored securely as it may represent the fundamental secret permitting encryption/decryption operations. A system may rotate through different keys from a key set so that if any one key is compromised, the effect of the compromised key may be limited to those values encrypted with the compromised key. Such a system may need a key version for a key used for each encrypted value to be stored in some way to permit future decryption.

For example, the key version to encrypt the number 1.23 may be three (e.g., the third key in a set), and the associated key may encrypt the number to 9.46. In this case the encrypted number, as well as the key version, would need to be stored in a same database, or in different databases. The need to store the key version presents technical challenges with respect to maintaining datastore/database schema.

In order to address at least these technical challenges associated with storage of a key version associated with a key for encryption/decryption of a number, the apparatuses, methods, and non-transitory computer readable media disclosed herein provide for storage of the key version within parts of a binary-coded-decimal format. In this regard, storage of the key version within parts of the binary-coded-decimal format obviates the need for separate storage of the key version, and/or database or data store schema changes.

For the apparatuses, methods, and non-transitory computer readable media disclosed herein, in order to store the key version as metadata embedded in a binary-coded-decimal value, one or more of the zone representations for a binary-coded-decimal may be identified, and appropriate zone values may be used to represent the key version used for the encryption. When decrypting, the zones may first be extracted, and the key version used may be determined from the extracted zones. Thus, by storage of the key version within parts of the binary-coded-decimal format, key version security is increased in that the need for a secondary storage source for the key version is eliminated.

For the apparatuses, methods, and non-transitory computer readable media disclosed herein, modules, as described herein, may be any combination of hardware and programming to implement the functionalities of the respective modules. In some examples described herein, the combinations of hardware and programming may be implemented in a number of different ways. For example, the programming for the modules may be processor executable instructions stored on a non-transitory machine-readable storage medium and the hardware for the modules may include a processing resource to execute those instructions.

In these examples, a computing device implementing such modules may include the machine-readable storage medium storing the instructions and the processing resource to execute the instructions, or the machine-readable storage medium may be separately stored and accessible by the computing device and the processing resource. In some examples, some modules may be implemented in circuitry.

Figure 1:
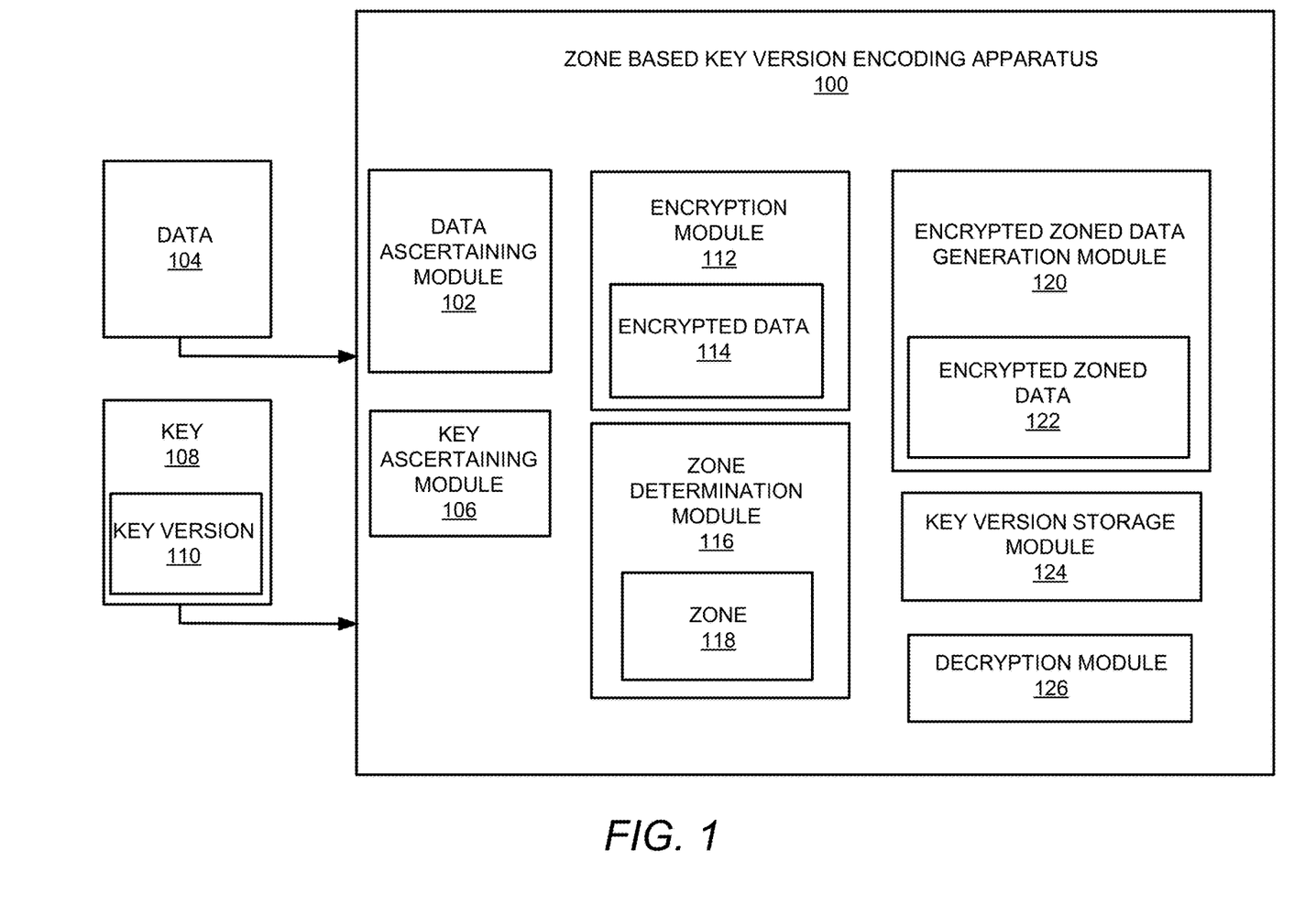
FIG. 1 illustrates an example layout of a zone based key version encoding apparatus.

FIG. 1 illustrates an example layout of a zone based key version encoding apparatus (hereinafter also referred to as "apparatus 100").

Referring to FIG. 1, the apparatus 100 may include a data ascertaining module 102 to ascertain data 104 that is to be encrypted. According to an example, the ascertained data may include a binary-coded-decimal number.

A key ascertaining module 106 is to ascertain a key 108, including a key version 110, that is to be used to encrypt the data 104.

An encryption module 112 is to generate encrypted data 114 by encrypting the data 104 based on the ascertained key 108. According to an example, the encryption module 112 is to generate the encrypted data 114 by applying format preserving encryption to encrypt the data 104 based on the ascertained key 108.

A zone determination module 116 is to determine a zone 118 representing the key version 110. According to an example, the zone determination module 116 is to determine the zone 118 representing the key version 110 by converting a decimal value of the key version 110 to a binary value, determining a binary zone value from the binary value, and converting the binary zone value to the zone 118 representing the key version 110.

An encrypted zoned data generation module 120 is to generate encrypted zoned data 122 by applying the determined zone 118 to the encrypted data 114 to encode the key version 110. According to an example, the encrypted zoned data generation module 120 is to generate the encrypted zoned data 122 by applying the determined zone 118 to the encrypted data 114 to encode the key version 110 by determining a byte corresponding to the encrypted data 114, and inserting the zone 118 representing the key version 110 into the byte corresponding to the encrypted data 114.

A key version storage module 124 is to store the encrypted zoned data 122 including the encoded key version 110.

With respect to decryption of the encrypted data 114, a decryption module 126 is to ascertain the encrypted zoned data 122. For example, the decryption module 126 is to ascertain the encrypted zoned data 122 at a subsequent time after generation of the encrypted zoned data 122, when the encrypted data 114 is to be decrypted.

The decryption module 126 is to extract the zone 118 representing the key version 110 from the ascertained encrypted zoned data 122.

The decryption module 126 is to determine, from the extracted zone 118 representing the key version 110, a decimal value corresponding to the key version 110. According to an example, the decryption module 126 is to determine, from the extracted zone 118 representing the key version 110, the decimal value corresponding to the key version 110 by converting the extracted zone 118 representing the key version 110 to a binary value, and converting the binary value to the decimal value corresponding to the key version 110.

The decryption module 126 is to ascertain the key 108 corresponding to the determined decimal value corresponding to the key version 110.

The decryption module 126 is to extract the encrypted data 114 from the encrypted zoned data 122. According to an example, the decryption module 126 is to extract the encrypted data 114 from the encrypted zoned data 122 by removing a zone bit from the encrypted zoned data 122.

The decryption module 126 is to decrypt the extracted encrypted data 114 based on the ascertained key 108 corresponding to the determined decimal value corresponding to the key version 110.

Referring to FIGS. 1-4, operation of the elements of the apparatus 100 is described in further detail.

Figure 2:
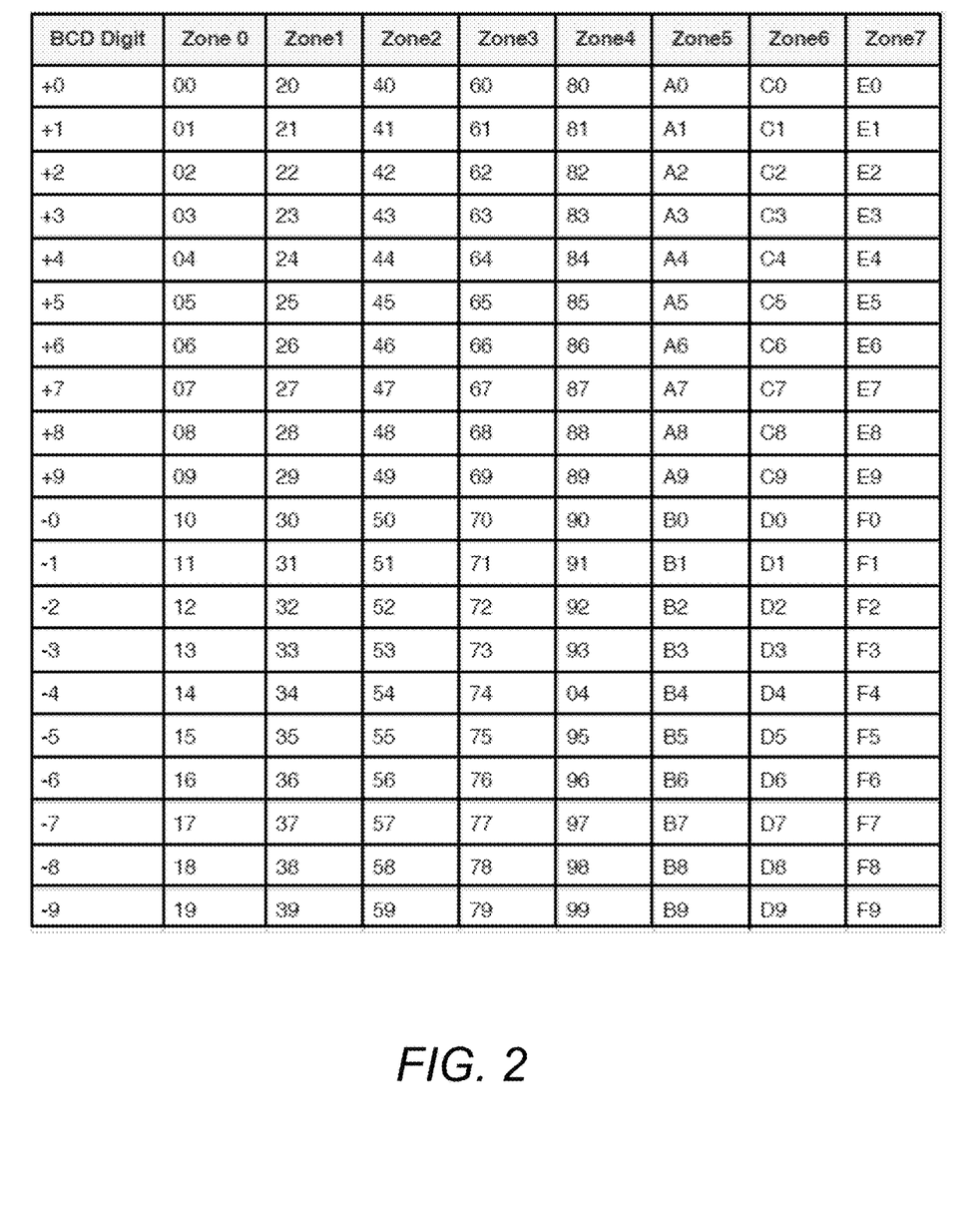
FIG. 2 illustrates a table including zone value hexadecimal values.

FIG. 2 illustrates a table including zone value hexadecimal values.

Referring to FIG. 2, the binary-coded-decimal format may represent a format of encoding decimal numbers 0 to 9 in a standard byte (8 bits). One version of the binary-coded-decimal format may divide the binary-coded-decimal byte into two parts. The lower four bits may represent the decimal number, and the upper four bits may represent "zone" values. A zone format may use the upper three bits to represent a zone value and its least significant bit of the upper four bits to represent the sign bit. The table of FIG. 2 illustrates zone value hexadecimal values.

Referring to FIG. 2, the values 29, 62, D1 may respectively represent the binary-coded-decimal digits 9, 2, −1, and concatenated together would represent the decimal value −921. In this case, a negative value is inferred if one or more of the individual binary-coded-decimal values is negative.

There are other forms of zone values that limit the available zones. One form includes the Extended Binary Coded Decimal Interchange Code (EBCDIC) standard. This standard defines four positive zones A*, C*, E* and F*, and two negative zones B* and D*, where '*' is the actual number of digits 0 through 9.

A zone may be enumerated as shown in FIG. 2, and the enumeration value may be used as a key identifier for binary-coded-decimal digits. For example, a value from 0 to 9 or −0 to −9 may be one of 8 possible zones, and when the value is encrypted with, for example, the $5^{th}$ key in a key set, then zone 4 would be used (e.g., hex values 80 to 89 or 90 to 99 as shown in FIG. 2). For example, the encrypted value 8 would be represented by 88, and the encrypted value −8 would be represented by 98 (both from zone 4).

In this regard, extended key sets may be created by representing values by a minimum number of digits. For example, the value 3 may be represented as 03, and thus two zone digits would be used, permitting up to 64 key versions. For example, the zone digits 37, 21 represent the number −71, and the two zones used are 3 and 1, respectively (e.g., see FIG. 2). In binary, these zones may be represented as 011 and 001. Concatenating these zones results in binary 011001, which is equivalent to hex value 19, or decimal 25. The decimal 25 in this case may be defined as combined zone 25 (combined zones would span 0 through 63), which is the $26^{th}$ ordinal zone, and may therefore represent key version 26.

Figure 3:
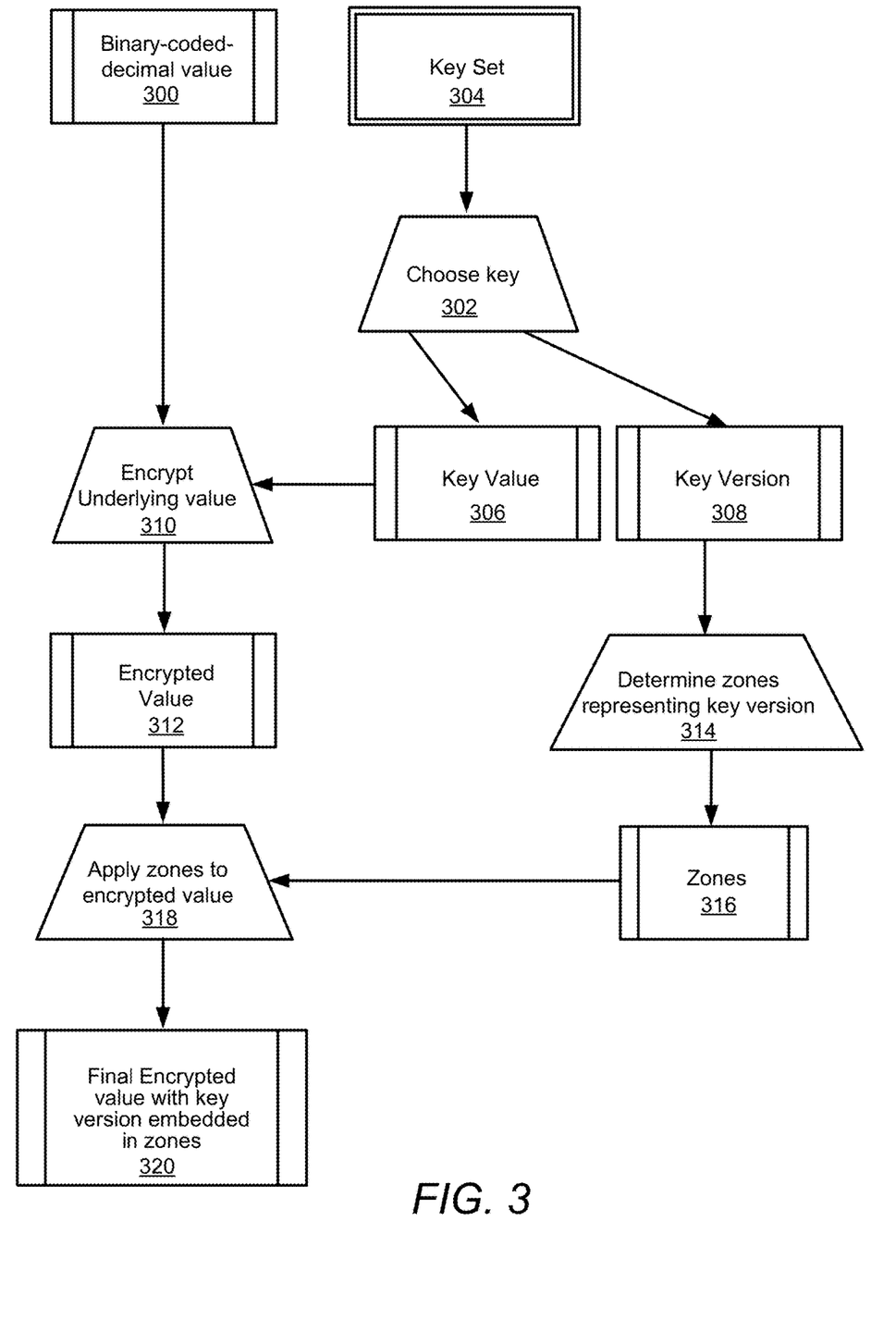
FIG. 3 illustrates an encryption flowchart to illustrate operation of the zone based key version encoding apparatus of FIG. 1.

FIG. 3 illustrates an encryption flowchart to illustrate operation of the apparatus 100.

At block 300, the data ascertaining module 102 is to ascertain the data 104 (e.g., a binary-coded-decimal value) that is to be encrypted. For example, the data 104 may include an unencrypted binary-coded-decimal value "39" represented as two bytes 03h 09h. In this case, two binary-coded-decimal digits provide two zones of three bits each, totaling 6 bits, which may represent up to 64 values.

At block 302, the key ascertaining module 106 is to ascertain a key 108 (e.g., from a key set at 304; see also block 306), including a key version 110 (see also block 308), that is to be used to encrypt the data 104.

At block 310, the encryption module 112 is to generate encrypted data 114 (e.g., see also block 312) by encrypting the data 104 based on the ascertained key 108. According to an example, the encryption module 112 is to generate the encrypted data 114 by applying format preserving encryption to encrypt the data 104 based on the ascertained key 108. For example, assuming that the encrypted data 114 includes a value of "53", the encrypted binary-coded-decimal value "53" may be represented as two bytes 05h 03h.

At block 314, the zone determination module 116 is to determine a zone 118 (e.g., see also block 316) representing the key version 110. For example, assuming that the key version 110 is "21", decimal value 21 is hex value 15h, or bit value 00010101, which may be represented as zone 010 (2) and zone 101 (5) (e.g., see FIG. 2).

At block 318, the encrypted zoned data generation module 120 is to generate the encrypted zoned data 122 (e.g., see also block 320) by applying the determined zone 118 to the encrypted data 114 to encode the key version 110. For example, zone (2) and zone (5) may be applied to generate the encrypted zoned data 122 as two bytes 25h 53h.

Figure 4:
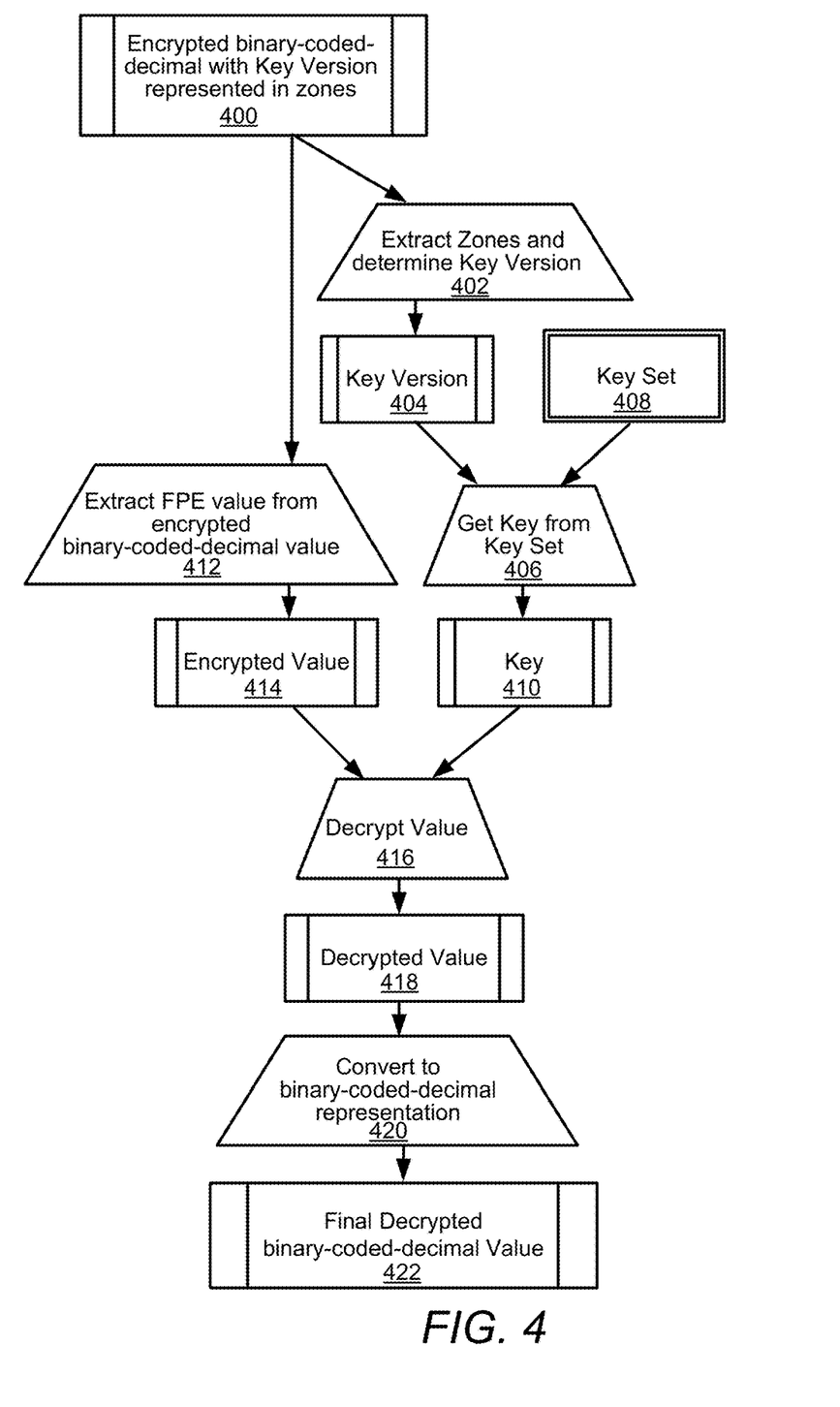
FIG. 4 illustrates a decryption flowchart to illustrate operation of the zone based key version encoding apparatus of FIG. 1.

FIG. 4 illustrates a decryption flowchart to illustrate operation of the apparatus 100.

At block 400, the decryption module 126 is to ascertain the encrypted zoned data 122. For example, the encrypted zoned data 122 may include encrypted binary-coded-decimal zoned value "53" represented as two bytes 25h 53h.

At block 402, the decryption module 126 is to extract the zone 118 representing the key version 110 (e.g., see also block 404) from the ascertained encrypted zoned data 122. For example, the decryption module 126 is to extract zone values 2 and 5 (e.g., binary 010 and 101).

At block 406, the decryption module 126 is to ascertain the key 108 (e.g., see also blocks 408 and 410) corresponding to the determined decimal value corresponding to the key version 110. For example, the binary values 010 and 101 may be combined to generate binary 010101, which is decimal value 21 (representing the key version).

At block 412, the decryption module 126 is to extract the encrypted data 114 (e.g., see also block 414) from the encrypted zoned data 122. For example, the decryption module 126 is to extract the encrypted data 114 as binary-coded-decimal value "53" represented as bytes 05h 03h.

At block 416, the decryption module 126 is to decrypt (e.g., see also block 418) the extracted encrypted data 114 based on the ascertained key 108 corresponding to the determined decimal value corresponding to the key version 110. For example, the decryption module 126 is to decrypt the binary-coded-decimal value "53" using key version "21".

At block 420, the decryption module 126 is to convert the decrypted value from block 418 to a binary-coded-decimal representation to generate the final decrypted binary-coded-decimal value (e.g., see also block 422). For example, the final decrypted binary-coded-decimal value may be determined as decrypted binary-coded-decimal value "39" represented by two bytes 03h 09h.

Figure 5:
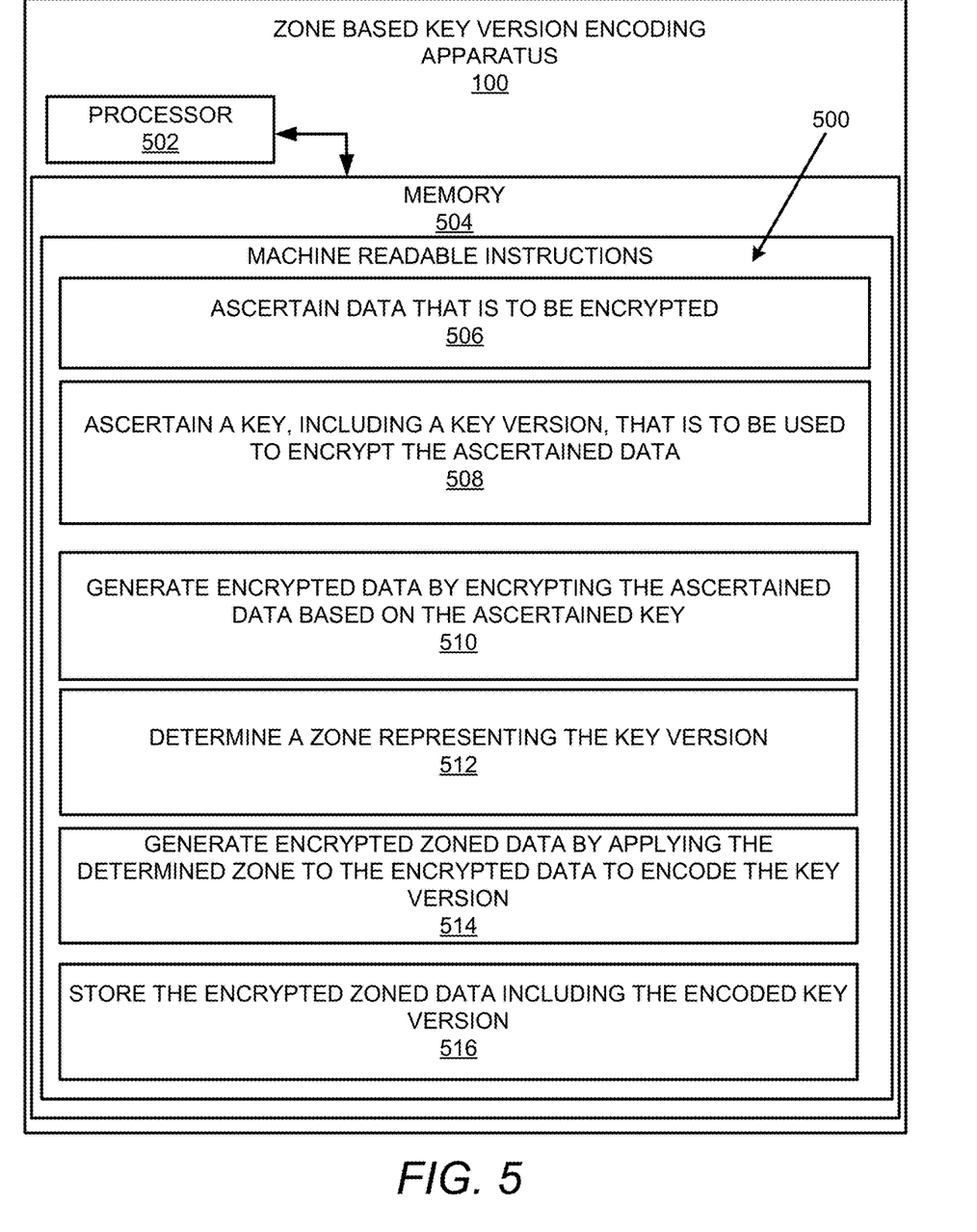
FIG. 5 illustrates an example block diagram for zone based key version encoding.
Figure 6:
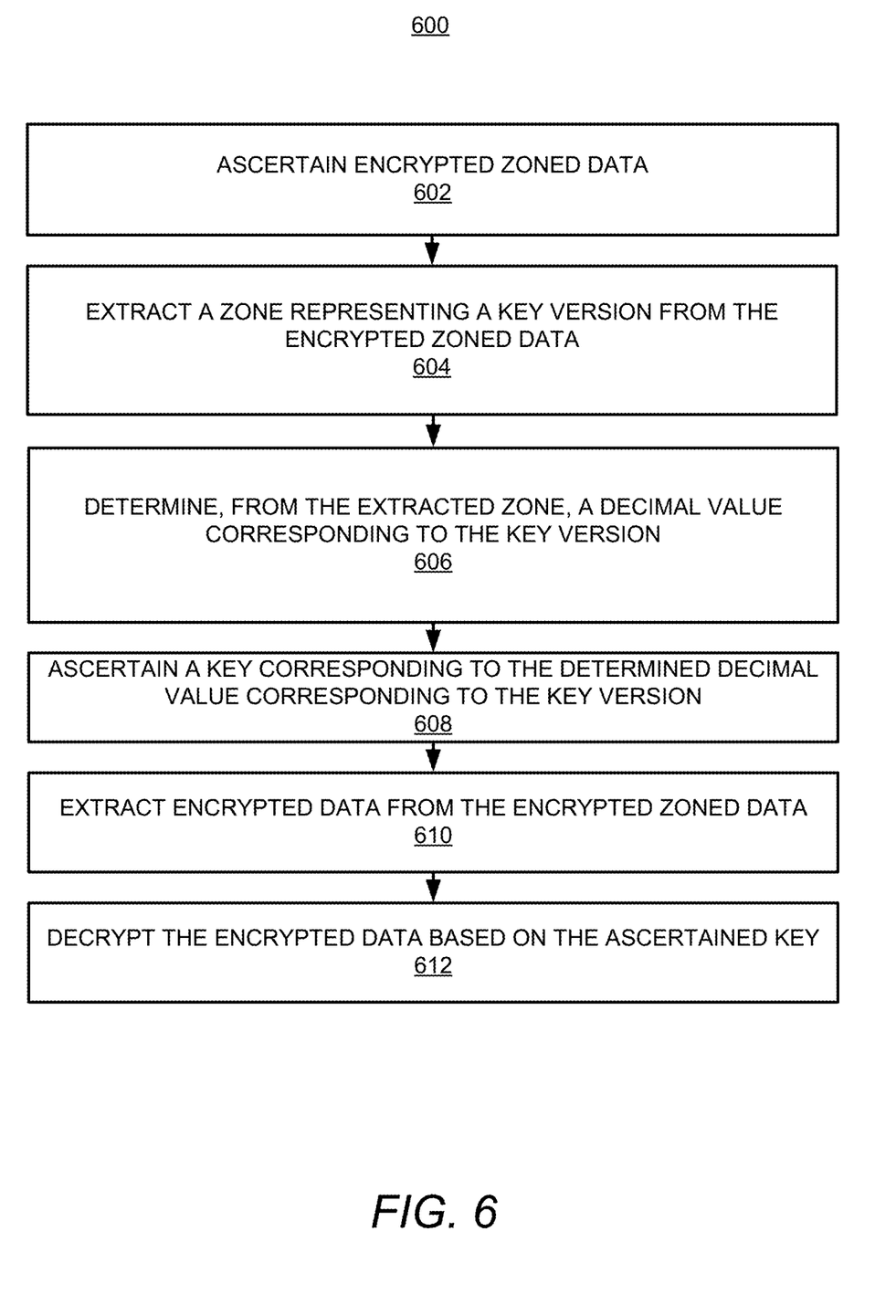
FIG. 6 illustrates an example flowchart of a method for zone based key version encoding.
Figure 7:
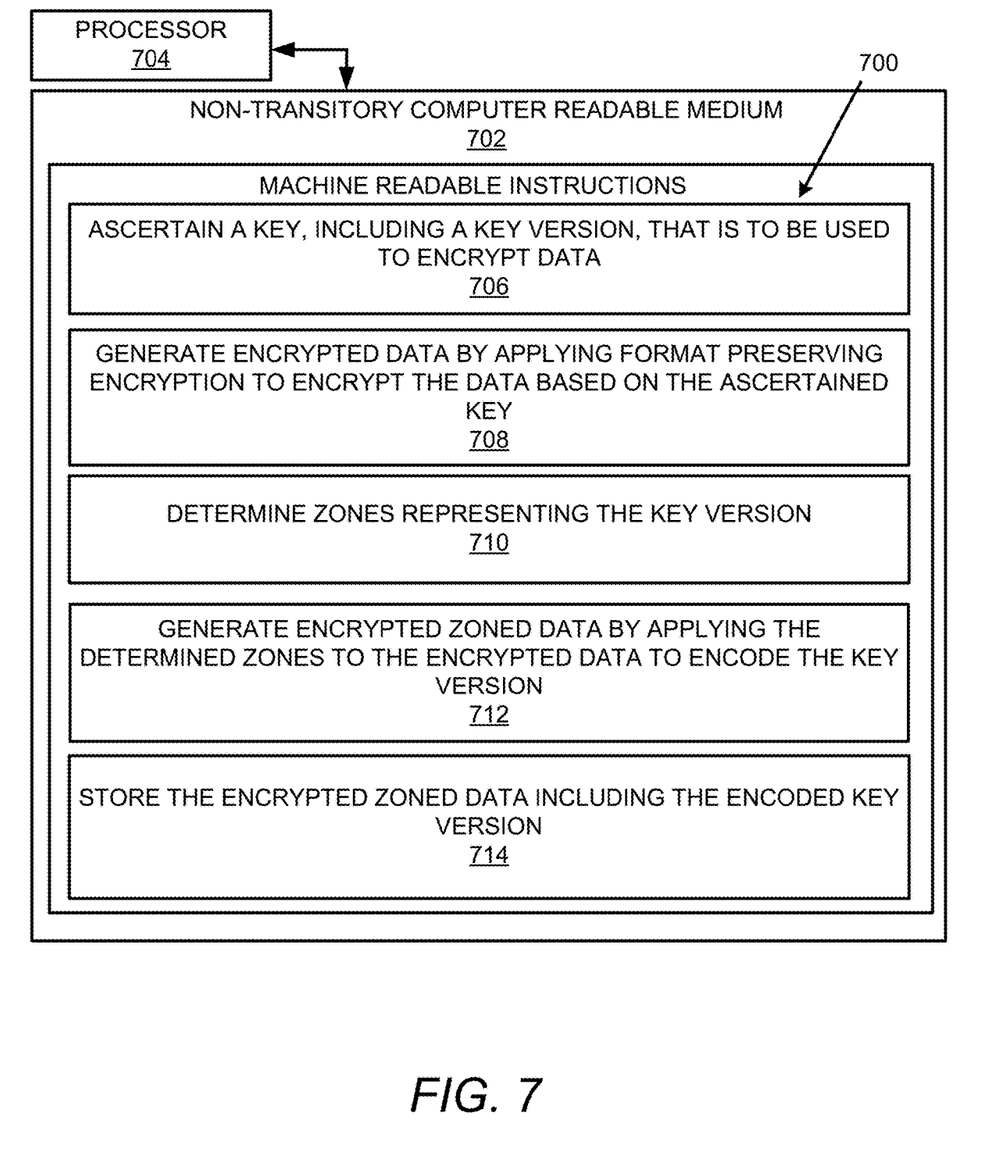
FIG. 7 illustrates a further example block diagram for zone based key version encoding.

FIGS. 5-7 respectively illustrate an example block diagram 500, an example flowchart of a method 600, and a further example block diagram 700 for zone based key version encoding. The block diagram 500, the method 600, and the block diagram 700 may be implemented on the apparatus 100 described above with reference to FIG. 1 by way of example and not limitation. The block diagram 500, the method 600, and the block diagram 700 may be practiced in other apparatus. In addition to showing the block diagram 500, FIG. 5 shows hardware of the apparatus 100 that may execute the instructions of the block diagram 500. The hardware may include a processor 502, and a memory 504 (i.e., a non-transitory computer readable medium) storing machine readable instructions that when executed by the processor cause the processor to perform the instructions of the block diagram 500. The memory 504 may represent a non-transitory computer readable medium. FIG. 6 may represent a method for zone based key version encoding, and the steps of the method. FIG. 7 may represent a non-transitory computer readable medium 702 having stored thereon machine readable instructions to provide zone based key version encoding. The machine readable instructions, when executed, cause a processor 704 to perform the instructions of the block diagram 700 also shown in FIG. 7.

The processor 502 of FIG. 5 and/or the processor 704 of FIG. 7 may include a single or multiple processors or other hardware processing circuit, to execute the methods, functions and other processes described herein. These methods, functions and other processes may be embodied as machine readable instructions stored on a computer readable medium, which may be non-transitory (e.g., the non-transitory computer readable medium 702 of FIG. 7), such as hardware storage devices (e.g., RAM (random access memory), ROM (read only memory), EPROM (erasable, programmable ROM), EEPROM (electrically erasable, programmable ROM), hard drives, and flash memory). The memory 504 may include a RAM, where the machine readable instructions and data for a processor may reside during runtime.

Referring to FIGS. 1-5, and particularly to the block diagram 500 shown in FIG. 5, the memory 504 may include instructions 506 to ascertain data 104 that is to be encrypted.

The processor 502 may fetch, decode, and execute the instructions 508 to ascertain a key 108, including a key version 110, that is to be used to encrypt the ascertained data 104.

The processor 502 may fetch, decode, and execute the instructions 510 to generate encrypted data 114 by encrypting the ascertained data 104 based on the ascertained key 108.

The processor 502 may fetch, decode, and execute the instructions 512 to determine a zone 118 representing the key version 110.

The processor 502 may fetch, decode, and execute the instructions 514 to generate encrypted zoned data 122 by applying the determined zone 118 to the encrypted data 114 to encode the key version 110.

The processor 502 may fetch, decode, and execute the instructions 516 to store the encrypted zoned data 122 including the encoded key version 110.

Referring to FIGS. 1-4 and 6, and particularly FIG. 6, for the method 600, at block 602, the method may include ascertaining encrypted zoned data 122.

At block 604 the method may include extracting a zone 118 representing a key version 110 from the ascertained encrypted zoned data 122.

At block 606 the method may include determining, from the extracted zone 118 representing the key version 110, a decimal value corresponding to the key version 110.

At block 608 the method may include ascertaining a key 108 corresponding to the determined decimal value corresponding to the key version 110.

At block 610 the method may include extracting the encrypted data 114 from the encrypted zoned data 122.

At block 612 the method may include decrypting the extracted encrypted data 114 based on the ascertained key 108.

Referring to FIGS. 1-4 and 7, and particularly FIG. 7, for the block diagram 700, the non-transitory computer readable medium 702 may include instructions 706 to ascertain a key 108, including a key version 110, that is to be used to encrypt data 104.

The processor 704 may fetch, decode, and execute the instructions 708 to generate encrypted data 114 by applying format preserving encryption to encrypt the data 104 based on the ascertained key 108.

The processor 704 may fetch, decode, and execute the instructions 710 to determine zones (e.g., a plurality of the zones 118) representing the key version 110.

The processor 704 may fetch, decode, and execute the instructions 712 to generate encrypted zoned data 122 by applying the determined zones to the encrypted data 114 to encode the key version 110.

The processor 704 may fetch, decode, and execute the instructions 714 to store the encrypted zoned data 122 including the encoded key version 110.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. An apparatus comprising:
a processor; and
a non-transitory computer readable medium storing machine readable instructions that when executed by the processor cause the processor to:
ascertain data that is to be encrypted;
ascertain a key, including a key version, that is to be used to encrypt the ascertained data;
generate encrypted data by encrypting the ascertained data based on the ascertained key;
determine, from a plurality of zones, a zone representing the key version;
generate encrypted zoned data by applying the determined zone to the encrypted data to encode the key version; and
store the encrypted zoned data including the encoded key version.

2. The apparatus according to claim 1, wherein the ascertained data includes a binary-coded-decimal (BCD) number.

3. The apparatus according to claim 1, wherein the instructions to generate the encrypted data by encrypting the ascertained data based on the ascertained key further comprise instructions to cause the processor to:
apply format preserving encryption to encrypt the ascertained data based on the ascertained key.

4. The apparatus according to claim 1, wherein the instructions to determine the zone representing the key version further comprise instructions to cause the processor to:
convert a decimal value of the key version to a binary value;
determine a binary zone value from the binary value; and
convert the binary zone value to the zone representing the key version.

5. The apparatus according to claim 1, wherein the instructions to generate the encrypted zoned data by applying the determined zone to the encrypted data to encode the key version further comprise instructions to cause the processor to:
determine a byte corresponding to the encrypted data; and
insert the zone representing the key version into the byte corresponding to the encrypted data.

6. The apparatus according to claim 1, wherein the instructions are further to cause the processor to:
ascertain the encrypted zoned data;
extract the zone representing the key version from the ascertained encrypted zoned data;
determine, from the extracted zone representing the key version, a decimal value corresponding to the key version; and
ascertain the key corresponding to the determined decimal value corresponding to the key version.

7. The apparatus according to claim 6, wherein the instructions are further to cause the processor to:
extract the encrypted data from the encrypted zoned data; and
decrypt the extracted encrypted data based on the ascertained key corresponding to the determined decimal value corresponding to the key version.

8. The apparatus according to claim 6, wherein the instructions to determine, from the extracted zone representing the key version, the decimal value corresponding to the key version further comprise instructions to cause the processor to:
convert the extracted zone representing the key version to a binary value; and
convert the binary value to the decimal value corresponding to the key version.

9. The apparatus according to claim 7, wherein the instructions to extract the encrypted data from the encrypted zoned data further comprise instructions to cause the processor to:
remove a zone bit from the encrypted zoned data.

10. A computer implemented method comprising:
ascertaining encrypted zoned data;
extracting a zone representing a key version from the encrypted zoned data;
determining, from the extracted zone, a decimal value corresponding to the key version;
ascertaining a key corresponding to the determined decimal value corresponding to the key version;
extracting encrypted data from the encrypted zoned data; and
decrypting the encrypted data based on the ascertained key.

11. The method according to claim 10, wherein determining, from the extracted zone, the decimal value corresponding to the key version further comprises:
converting the extracted zone to a binary value; and
converting the binary value to the decimal value corresponding to the key version.

12. The method according to claim 10, wherein the encrypted zoned data is determined by:
ascertaining data that is to be encrypted;
ascertaining the key, including the key version, that is to be used to encrypt the ascertained data; and
generating encrypted data by encrypting the ascertained data based on the ascertained key that is to be used to encrypt the ascertained data.

13. The method according to claim 12, wherein the encrypted zoned data is determined by:
determining the zone representing the key version; and generating the encrypted zoned data by applying the determined zone to the generated encrypted data to encode the key version.

14. A non-transitory computer readable medium having stored thereon machine readable instructions, the machine readable instructions, when executed, cause a processor to:
   ascertain a key, including a key version, that is to be used to encrypt data;
   generate encrypted data by applying format preserving encryption to encrypt the data based on the ascertained key;
   determine zones representing the key version;
   generate encrypted zoned data by applying the determined zones to the encrypted data to encode the key version; and
   store the encrypted zoned data including the encoded key version.

15. The non-transitory computer readable medium according to claim 14, wherein the machine readable instructions to determine the zones representing the key version further comprise instructions, that when executed, further cause the processor to:
   convert a decimal value of the key version to a binary value;
   determine binary zone values from the binary value; and
   convert the binary zone values to the zones representing the key version.

16. The non-transitory computer readable medium according to claim 14, wherein the machine readable instructions to generate the encrypted zoned data by applying the determined zones to the encrypted data to encode the key version further comprise instructions, that when executed, further cause the processor to:
   determine bytes corresponding to the encrypted data; and
   insert the zones representing the key version into the bytes corresponding to the encrypted data.

17. The non-transitory computer readable medium according to claim 14, wherein the machine readable instructions, when executed, further cause the processor to:
   ascertain the encrypted zoned data;
   extract the zones representing the key version from the ascertained encrypted zoned data;
   determine, from the extracted zones representing the key version, a decimal value corresponding to the key version; and
   ascertain the key corresponding to the determined decimal value corresponding to the key version.

18. The non-transitory computer readable medium according to claim 17, wherein the machine readable instructions, when executed, further cause the processor to:
   extract the encrypted data from the encrypted zoned data; and
   decrypt the extracted encrypted data based on the ascertained key corresponding to the determined decimal value corresponding to the key version.

19. The non-transitory computer readable medium according to claim 17, wherein the machine readable instructions to determine, from the extracted zones representing the key version, the decimal value corresponding to the key version further comprise instructions, that when executed, further cause the processor to:
   convert the extracted zones representing the key version to a binary value; and
   convert the binary value to the decimal value corresponding to the key version.

20. The non-transitory computer readable medium according to claim 18, wherein the machine readable instructions to extract the encrypted data from the encrypted zoned data further comprise instructions, that when executed, further cause the processor to:
   remove zone bits from the encrypted zoned data.

* * * * *